(12) United States Patent
Lee et al.

(10) Patent No.: US 11,648,982 B2
(45) Date of Patent: May 16, 2023

(54) REAR SIDE STRUCTURE FOR VEHICLE

(71) Applicants: Hyundai Motor Company, Seoul (KR); Kia Corporation, Seoul (KR)

(72) Inventors: Sun Ju Lee, Incheon (KR); Il Do Kim, Suwon-si (KR)

(73) Assignees: Hyundai Motor Company, Seoul (KR); Kia Corporatlon, Seoul (KR)

( * ) Notice: Subject to any disclaimer, the term of this patent is extended or adjusted under 35 U.S.C. 154(b) by 17 days.

(21) Appl. No.: 17/322,421

(22) Filed: May 17, 2021

(65) Prior Publication Data

US 2022/0126919 A1 Apr. 28, 2022

(30) Foreign Application Priority Data

Oct. 26, 2020 (KR) ........................ 10-2020-0139590

(51) Int. Cl.
*B62D 21/11* (2006.01)
(52) U.S. Cl.
CPC ................................... *B62D 21/11* (2013.01)
(58) Field of Classification Search
CPC ...... B62D 25/08; B62D 25/088; B62D 25/16; B62D 25/2036; B62D 21/11
USPC .................................. 280/124.147, 124.155
See application file for complete search history.

(56) References Cited

U.S. PATENT DOCUMENTS

| | | | | |
|---|---|---|---|---|
| 4,408,794 A * | 10/1983 | Harasaki | .............. | B62D 25/088 296/198 |
| 4,723,811 A * | 2/1988 | Harasaki | .............. | B62D 25/088 296/203.02 |
| 5,246,263 A * | 9/1993 | Tanaka | ................. | B62D 25/088 296/187.11 |
| 6,086,100 A * | 7/2000 | Corporon | ............... | B62D 25/04 280/808 |
| 6,209,205 B1 * | 4/2001 | Rumpel | ............... | B62D 25/088 29/401.1 |
| 6,648,401 B2 * | 11/2003 | Behnke | ................ | B62D 25/088 296/30 |
| 6,773,057 B2 * | 8/2004 | Nomura | ............... | B62D 25/088 296/203.02 |
| 7,021,703 B2 * | 4/2006 | Yamaguchi | .......... | B60G 15/067 296/203.02 |
| 7,281,756 B2 * | 10/2007 | Fukushi | ............... | B62D 25/088 296/204 |
| 7,364,225 B2 * | 4/2008 | Tomioka | ................ | B62D 25/02 296/203.04 |
| 7,841,652 B2 * | 11/2010 | Leonetti | ............ | B62D 25/2027 296/198 |

(Continued)

FOREIGN PATENT DOCUMENTS

| | | | | | |
|---|---|---|---|---|---|
| JP | | 58063577 A | * | 4/1983 | ........... B62D 25/088 |
| JP | | 11180347 A | * | 7/1999 | ........... B62D 25/088 |

(Continued)

*Primary Examiner* — Laura Freedman (74) *Attorney, Agent, or Firm* — Slater Matsil, LLP (57) ABSTRACT

An embodiment rear side structure for a vehicle includes a rear side member extending in a longitudinal direction of the vehicle, a shock absorber mounting member connected to the rear side member, and a rear wheelhouse panel connected to the shock absorber mounting member, wherein the shock absorber mounting member and the rear wheelhouse panel are joined so that the shock absorber mounting member and the rear wheelhouse panel form a wheel arch.

20 Claims, 10 Drawing Sheets

(56) References Cited

U.S. PATENT DOCUMENTS

| | | | |
|---|---|---|---|
| 8,585,131 B2 | 11/2013 | Rawlinson et al. | |
| 9,193,391 B2 * | 11/2015 | Mildner | B62D 25/088 |
| 9,272,738 B2 * | 3/2016 | Lee | B62D 25/2036 |
| 9,604,674 B2 * | 3/2017 | Fujii | B62D 25/04 |
| 9,815,500 B1 * | 11/2017 | Lee | B62D 25/088 |
| 9,889,889 B2 * | 2/2018 | Park | B60R 19/24 |
| 10,308,288 B2 * | 6/2019 | Kiyoshita | B62D 25/02 |
| 10,494,031 B2 * | 12/2019 | Masuda | B62D 25/088 |
| 10,906,591 B2 * | 2/2021 | Ogawa | B62D 25/088 |
| 11,052,949 B2 * | 7/2021 | Yamada | B62D 25/087 |
| 11,273,874 B2 * | 3/2022 | Nishimura | B62D 25/087 |
| 2004/0232647 A1 * | 11/2004 | Kim | B60G 15/067 |
| | | | 280/124.155 |
| 2012/0138757 A1 * | 6/2012 | Hong | B62D 25/088 |
| | | | 248/205.1 |
| 2022/0001926 A1 * | 1/2022 | Kim | B62D 21/11 |

FOREIGN PATENT DOCUMENTS

| | | | | |
|---|---|---|---|---|
| JP | 2009073297 A | * | 4/2009 | B62D 25/087 |
| JP | 2014113979 A | * | 6/2014 | B62D 25/088 |
| JP | 2016203709 A | * | 12/2016 | B62D 25/02 |
| JP | 2017039347 A | * | 2/2017 | B62D 25/088 |
| JP | 2018187962 A | * | 11/2018 | B62D 25/02 |

* cited by examiner

REAR SIDE STRUCTURE FOR VEHICLE

CROSS-REFERENCE TO RELATED APPLICATIONS

This application claims the benefit of Korean Patent Application No. 10-2020-0139590, filed on Oct. 26, 2020, in the Korean Intellectual Property Office, which application is hereby incorporated herein by reference.

TECHNICAL FIELD

The present disclosure relates to a rear side structure for a vehicle.

BACKGROUND

In recent years, as the perception of environmental crisis and depletion of oil resources has increased, eco-friendly electric vehicles such as electric vehicles (EVs) and hybrid electric vehicles (HEVs) have risen to prominence. Each of EVs and HEVs has one or more batteries mounted on the bottom of a vehicle body, and accordingly it has increased weight due to such relatively heavy batteries, compared to internal combustion engine vehicles.

It is very important for the eco-friendly electric vehicles to reduce the weight of the vehicle in order to improve all electric range (AER). Accordingly, lightweight materials, such as aluminum and CFRP, are being applied to a plurality of members, a plurality of panels, etc. constituting the vehicle body.

Meanwhile, a rear side structure for a vehicle may include a rear side member, a shock absorber mounting member connected to the rear side member, and a reinforcement member connected to the shock absorber mounting member. The rear side member may serve as a crashworthy member, and the rear side member may be manufactured by hot-stamping a rigid material such as steel. The rear side member may include an inner member and an outer member. A plurality of bulkheads may be mounted inside the rear side member to increase stiffness of the rear side member, and the plurality of bulkheads may be placed individually in portions of the rear side member where the cross section of the rear side member is changed. In addition, the inner member of the rear side member may be manufactured by high vacuum die casting, and a flange of the inner member may be connected to a flange of the outer member through self-piercing riveting (SPR), and accordingly the rear side member may have a closed cross section. The shock absorber mounting member may be connected to the rear side member by welding and/or the like, and a top end of a rear shock absorber may be mounted and supported to the shock absorber mounting member. The reinforcement members may be connected to the shock absorber mounting member, and the shock absorber mounting member may secure attachment stiffness or stiffness at mounting points and formability by the reinforcement members. The reinforcement members and the shock absorber mounting member may be attached to a rear wheelhouse panel.

As for the rear side structure manufactured by high vacuum die casting according to the related art, the inner member and the outer member of the rear side member may be joined through SPR, which reduce the stiffness and crashworthiness of the rear side member.

In the related art steel rear side structure, as the plurality of bulkheads are arranged in the rear side member, the weight and manufacturing cost of the rear side member may relatively increase.

In the related art rear side structure, as the shock absorber mounting member and the reinforcement members are attached to the rear wheelhouse panel at the plurality of mounting points, the weight and manufacturing cost may increase and a relatively large number of components may be required.

The above information described in this background section is provided to assist in understanding the background of the inventive concept, and may include any technical concept which is not considered as the prior art that is already known to those skilled in the art.

SUMMARY

The present disclosure relates to a rear side structure for a vehicle. Particular embodiments relate to a rear side structure for a vehicle capable of simplifying a connection structure of a rear side member, a rear wheelhouse panel, a reinforcement member, and a shock absorber mounting member so that the rear side member, the reinforcement member, and the shock absorber mounting member may be manufactured by a low-pressure hollow casting method, and the cost and weight may be reduced.

Embodiments of the present disclosure can solve problems occurring in the prior art while advantages achieved by the prior art are maintained intact.

An embodiment of the present disclosure provides a rear side structure for a vehicle capable of simplifying a connection structure of a rear side member, a rear wheelhouse panel, a reinforcement member, and a shock absorber mounting member so that the rear side member, the reinforcement member, and the shock absorber mounting member may be manufactured by a low-pressure hollow casting method, and the cost and weight may be reduced.

According to an embodiment of the present disclosure, a rear side structure for a vehicle may include a rear side member extending in a longitudinal direction of the vehicle, a shock absorber mounting member connected to the rear side member, and a rear wheelhouse panel connected to the shock absorber mounting member, wherein the shock absorber mounting member and the rear wheelhouse panel may be joined so that the shock absorber mounting member and the rear wheelhouse panel may form a wheel arch.

The rear side member may include a cavity, and the cavity may have a closed transverse cross-section.

The shock absorber mounting member may include a cavity, and the cavity may have a closed transverse cross-section.

The shock absorber mounting member may include a shock absorber mounting wall to which a top end of a shock absorber is mounted, a front reinforcing portion located in front of the shock absorber mounting wall, and a rear reinforcing portion located behind the shock absorber mounting wall. The front reinforcing portion may include a cavity communicating with a cavity of the shock absorber mounting member, and the rear reinforcing portion may include a cavity communicating with the cavity of the shock absorber mounting member.

The rear side member may include an outboard side flange facing the exterior of the vehicle, and the shock absorber mounting member and the rear wheelhouse panel may be connected to the outboard side flange.

The rear side member may include a top wall, a bottom wall opposing the top wall, an inboard side wall facing the interior of the vehicle, and an outboard side wall facing the exterior of the vehicle. The rear side member may include a cavity defined by the top wall, the bottom wall, the inboard side wall, and the outboard side wall, and the outboard side flange may protrude upwardly from the top wall.

The shock absorber mounting member may include an upper side wall extending outward from the shock absorber mounting wall in a radial direction of the wheel arch, an outer peripheral wall extending from the upper side wall toward the exterior of the vehicle, an inner peripheral wall spaced apart inward from the outer peripheral wall in the radial direction of the wheel arch, and a lower side wall extending inward from the shock absorber mounting wall in the radial direction of the wheel arch, and the cavity of the shock absorber mounting member may be defined by the outer peripheral wall, the inner peripheral wall, and the upper side wall.

The lower side wall may be connected to an outboard side flange of the rear side member by a plurality of fasteners.

The front reinforcing portion may include an inboard side projection bead protruding from a front edge of the shock absorber mounting member toward the interior of the vehicle, and an outboard side projection bead protruding from the front edge of the shock absorber mounting member toward the exterior of the vehicle, and the cavity of the front reinforcing portion may be defined by the inboard side projection bead and the outboard side projection bead.

A lower edge of the inboard side projection bead of the front reinforcing portion and a lower edge of the outboard side projection bead of the front reinforcing portion may be connected to the rear side member.

The rear reinforcing portion may include an inboard side projection bead protruding from a rear edge of the shock absorber mounting member toward the interior of the vehicle, and an outboard side projection bead protruding from the rear edge of the shock absorber mounting member toward the exterior of the vehicle, and the cavity of the rear reinforcing portion may be defined by the inboard side projection bead and the outboard side projection bead.

A lower edge of the inboard side projection bead of the rear reinforcing portion and a lower edge of the outboard side projection bead of the rear reinforcing portion may be connected to the rear side member.

The shock absorber mounting member may further include a plurality of reinforcing ribs, and the plurality of reinforcing ribs may be provided on an inboard side surface of the shock absorber mounting member.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
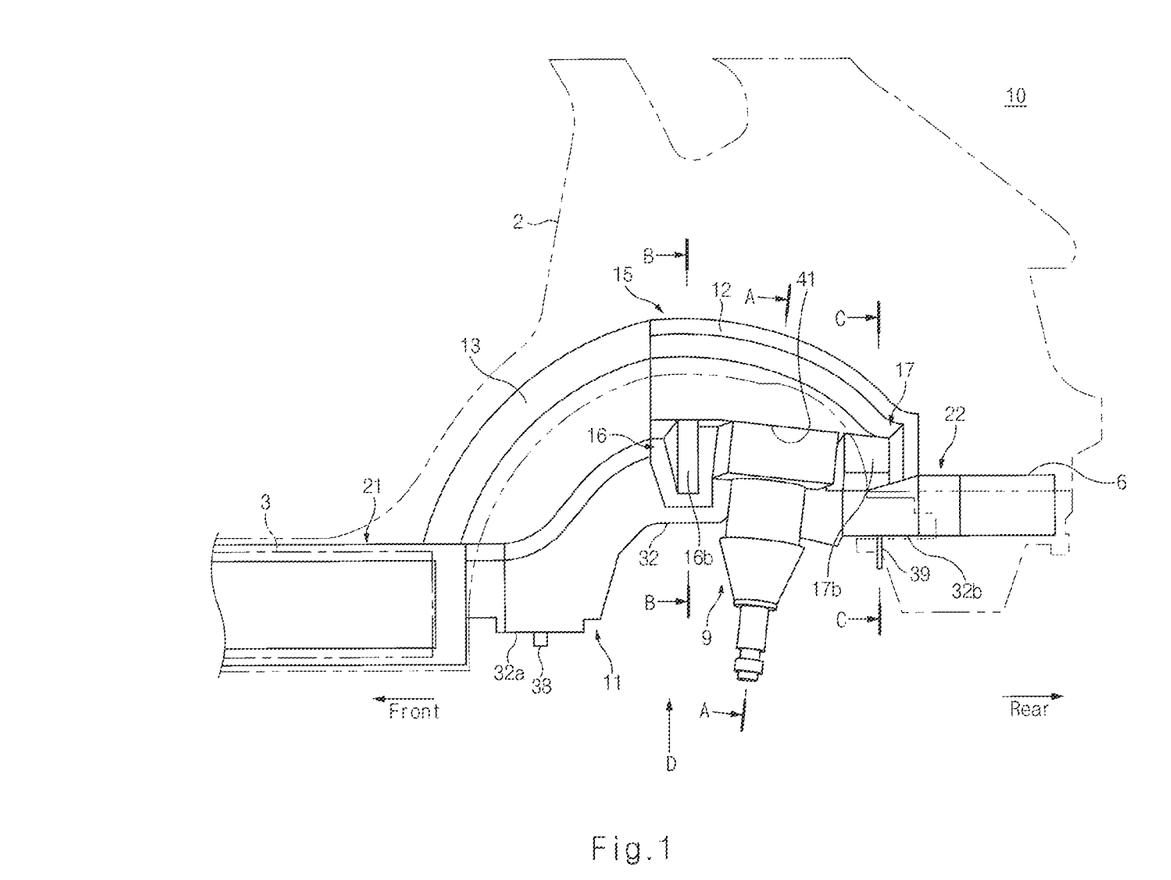
FIG. 1 illustrates a side view of a rear side structure for a vehicle according to an exemplary embodiment of the present disclosure.

Referring to FIG. 1, a rear side structure 10 for a vehicle according to an exemplary embodiment of the present disclosure may include a rear side member 11 extending in a longitudinal direction of the vehicle, a shock absorber mounting member 12 connected to the rear side member 11, and a rear wheelhouse panel 13 connected to the shock absorber mounting member 12.

A pair of side bodies 2 may be disposed on both sides of a vehicle body, and floors 4 and 5 may be transverse to bottom ends of the pair of side bodies 2. The floors 4 and 5 may include a center floor panel 4 and a rear floor panel 5. A pair of side sills 3 may be connected to both edges of the center floor panel 4, and a pair of rear longitudinal members 6 may be located on a rear end portion of the vehicle body. The pair of rear longitudinal members 6 may be spaced apart from each other in a width direction of the vehicle.

The pair of rear side members 11 may be spaced apart from each other in the width direction of the vehicle, and the pair of rear side members 11 may be connected to both edges of the floors 4 and 5. FIG. 1 illustrates a left rear side member 11 located on the left side of the vehicle. A right rear side member (not shown) may be located on the right side of the vehicle.

Figure 2:
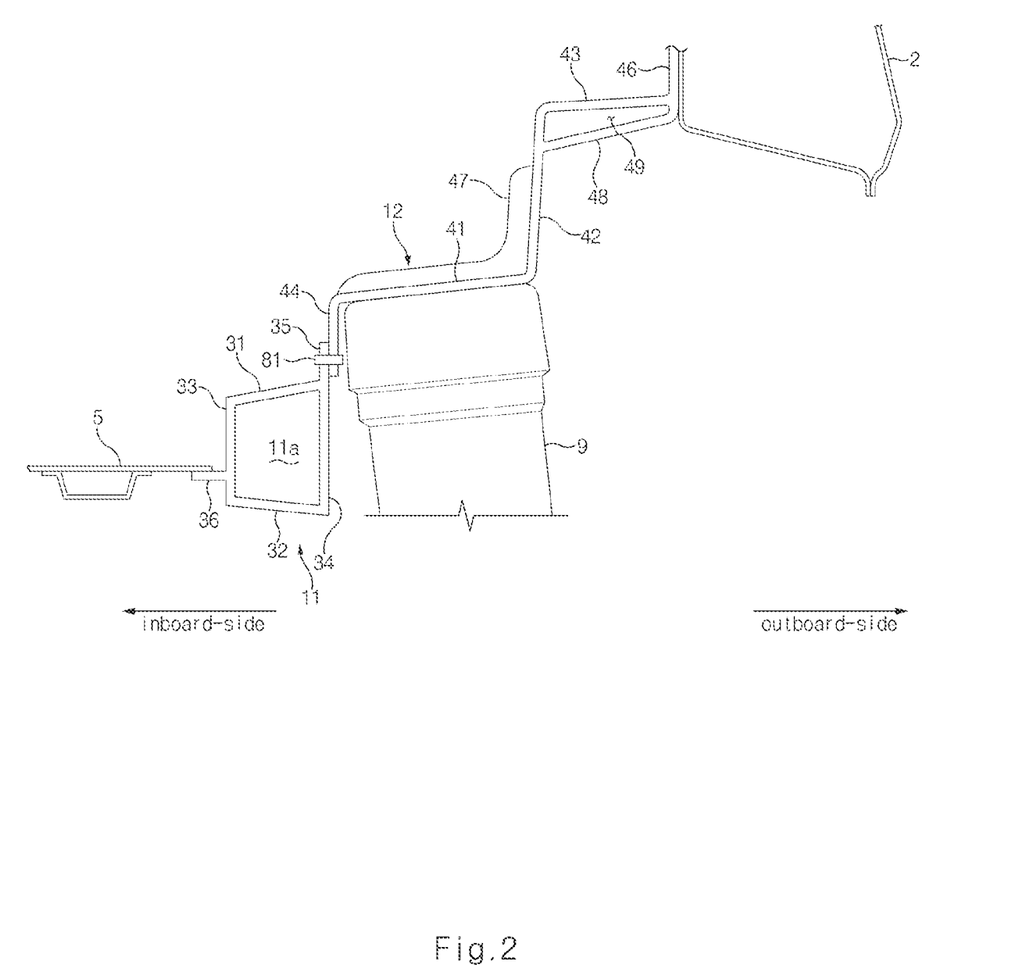
FIG. 2 illustrates a cross-sectional view taken along line A-A of FIG. 1.

Referring to FIG. 2, each rear side member 11 may include a top wall 31, a bottom wall 32 opposing the top wall 31, an inboard side wall 33 facing the interior of the vehicle, and an outboard side wall 34 facing the exterior of the vehicle.

Figure 6:
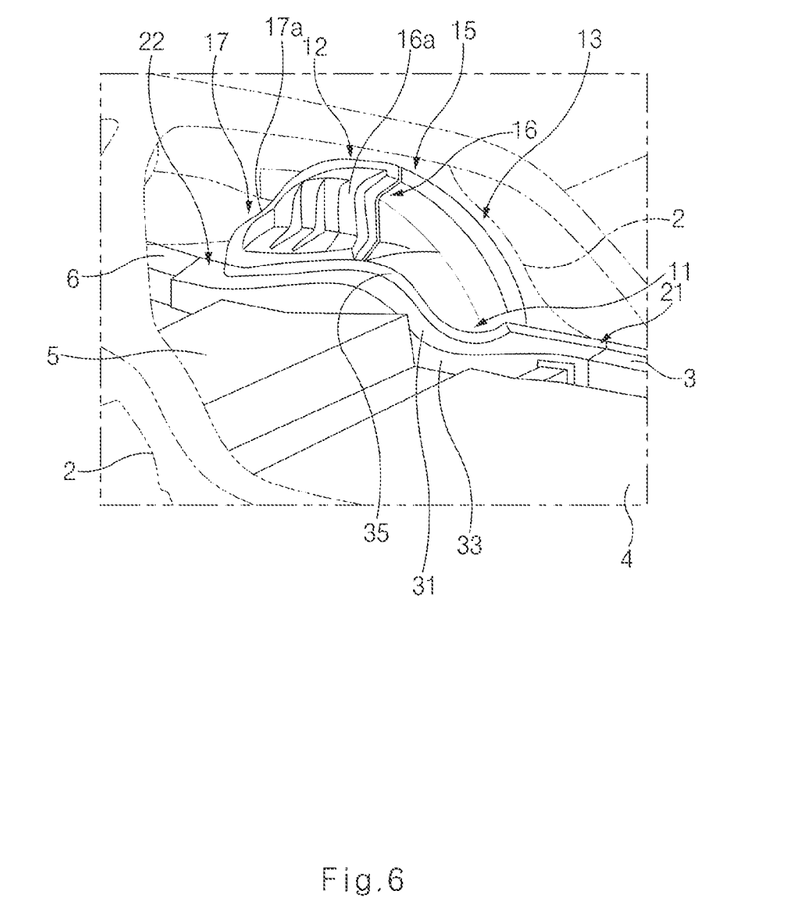
FIG. 6 illustrates a perspective view of a rear side structure for a vehicle according to an exemplary embodiment of the present disclosure, which is viewed from the interior of the vehicle.
Figure 7:
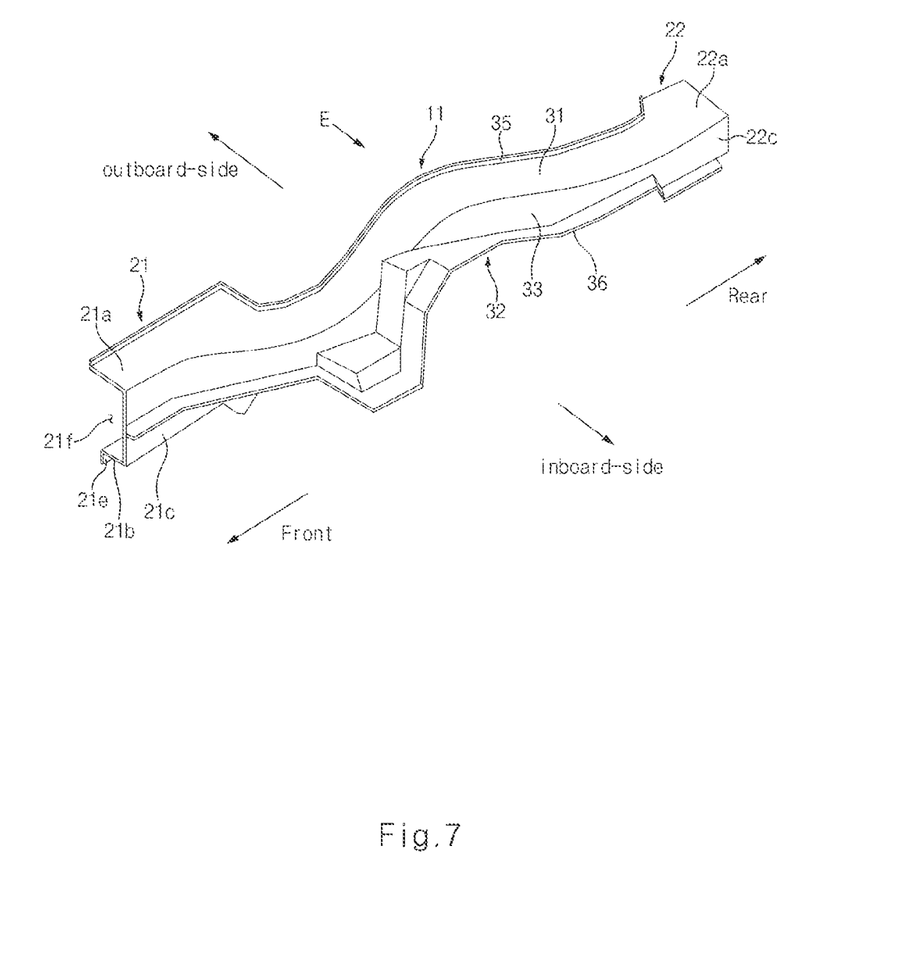
FIG. 7 illustrates a perspective view of a rear side member in a rear side structure for a vehicle according to an exemplary embodiment of the present disclosure.

Referring to FIGS. 6 and 7, the top wall 31 may face the top of the vehicle, and the top wall 31 may extend in the longitudinal direction of the vehicle. The rear side member 11 may include an outboard side flange 35 extending along an outboard side edge of the top wall 31. The outboard side flange 35 may protrude upwardly from the outboard side edge of the top wall 31, and the outboard side flange 35 may face the exterior of the vehicle. The outboard side flange 35 may have a shape corresponding to that of the shock absorber mounting member 12 and the rear wheelhouse panel 13. The shock absorber mounting member 12 and the rear wheelhouse panel 13 may be connected to the outboard side flange 35 by welding, using fasteners, and/or the like.

The bottom wall 32 may face the bottom of the vehicle (or the ground), and the bottom wall 32 may extend in the longitudinal direction of the vehicle.

Figure 5:
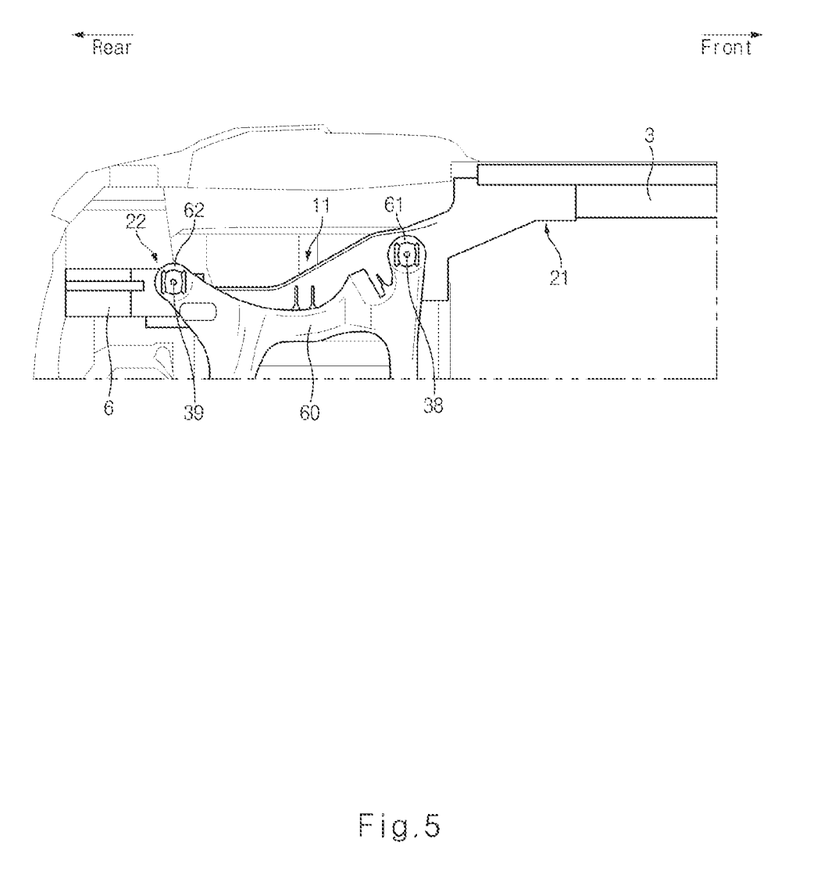
FIG. 5 illustrates a bottom view which is viewed in a direction indicated by arrow D of FIG. 1.

Each rear side member 11 may include a front mounting hardware component 38 and a rear mounting hardware component 39 to which a chassis component such as a rear subframe 6o is mounted. The front mounting hardware component 38 and the rear mounting hardware component 39 may be integrally formed with the bottom wall 32. The front mounting hardware component 38 may be relatively close to the front of the rear side member 11 (a front connection portion 21 to be described), and the rear mounting hardware component 39 may be relatively close to the rear of the rear side member 11 (a rear connection portion 22 to be described). Referring to FIG. 5, the front mounting hardware component 38 may be relatively close to the front of the vehicle, and the rear mounting hardware component 39 may be relatively close to the rear of the vehicle. A front mounting portion 61 of the rear subframe 60 may be mounted to the front mounting hardware component 38 through a front elastic bush, and a rear mounting portion 62 of the rear subframe 60 may be mounted to the rear mounting hardware component 39 through a rear elastic bush. For example, the front mounting hardware component 38 may be a pipe nut extending vertically from the bottom wall 32, and the rear mounting hardware component 39 may be a mounting stud or mounting rod extending vertically from the bottom wall 32.

Referring to FIG. 1, the bottom wall 32 may have a first mounting surface 32a on which the front mounting hardware component 38 is provided, and a second mounting surface 32b on which the rear mounting hardware component 39 is provided. The first mounting surface 32a may be located in front of the second mounting surface 32b. The first mounting surface 32a and the second mounting surface 32b may be flat considering the contact with the front elastic bush and the rear elastic bush. According to an exemplary embodiment of the present disclosure, the mounting hardware components 38 and 39 for mounting the subframe may be integrally formed with the bottom wall 32 of the rear side member 11, which means that separate brackets and the like for assembly of the mounting hardware components 38 and 39 are unnecessary. Thus, the manufacturing cost and weight may be reduced.

Figure 3:
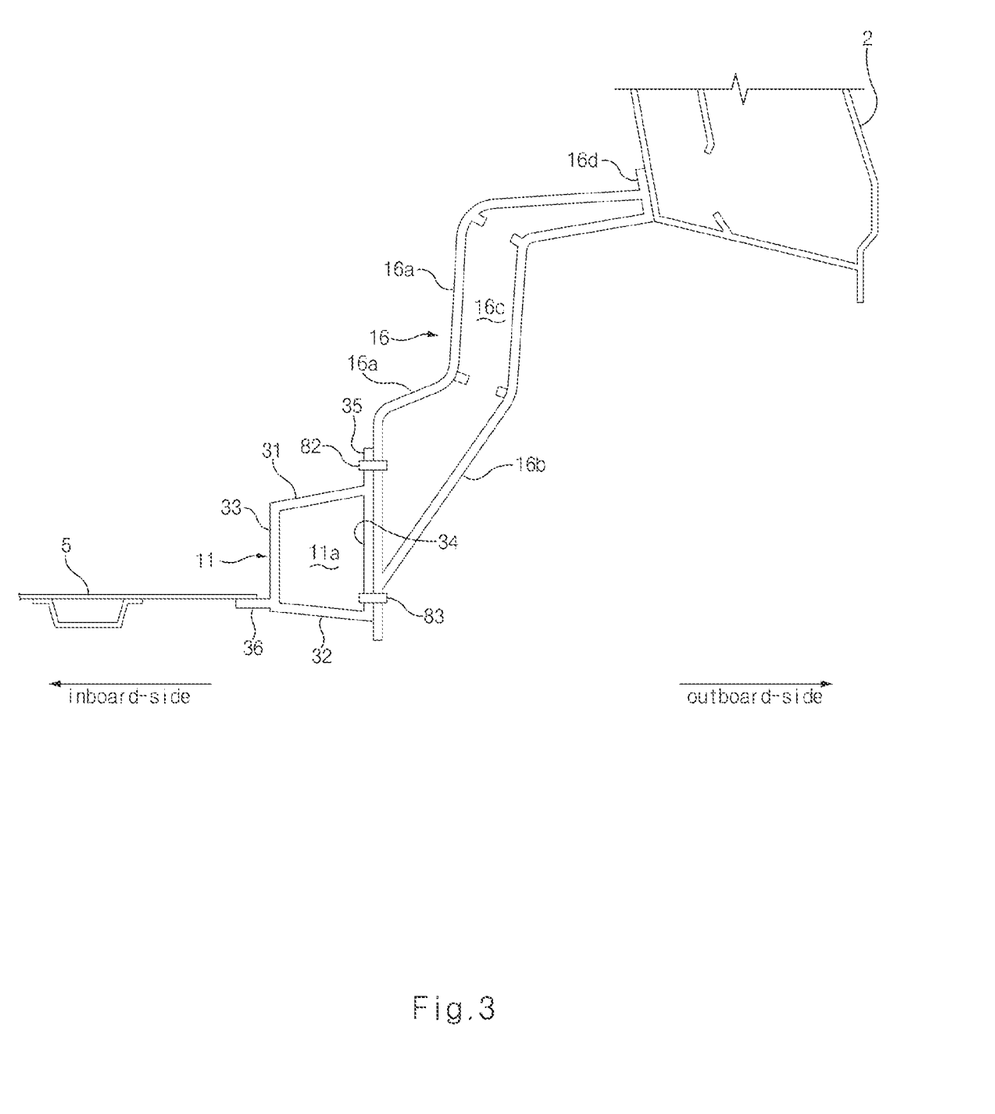
FIG. 3 illustrates a cross-sectional view taken along line B-B of FIG. 1.
Figure 4:
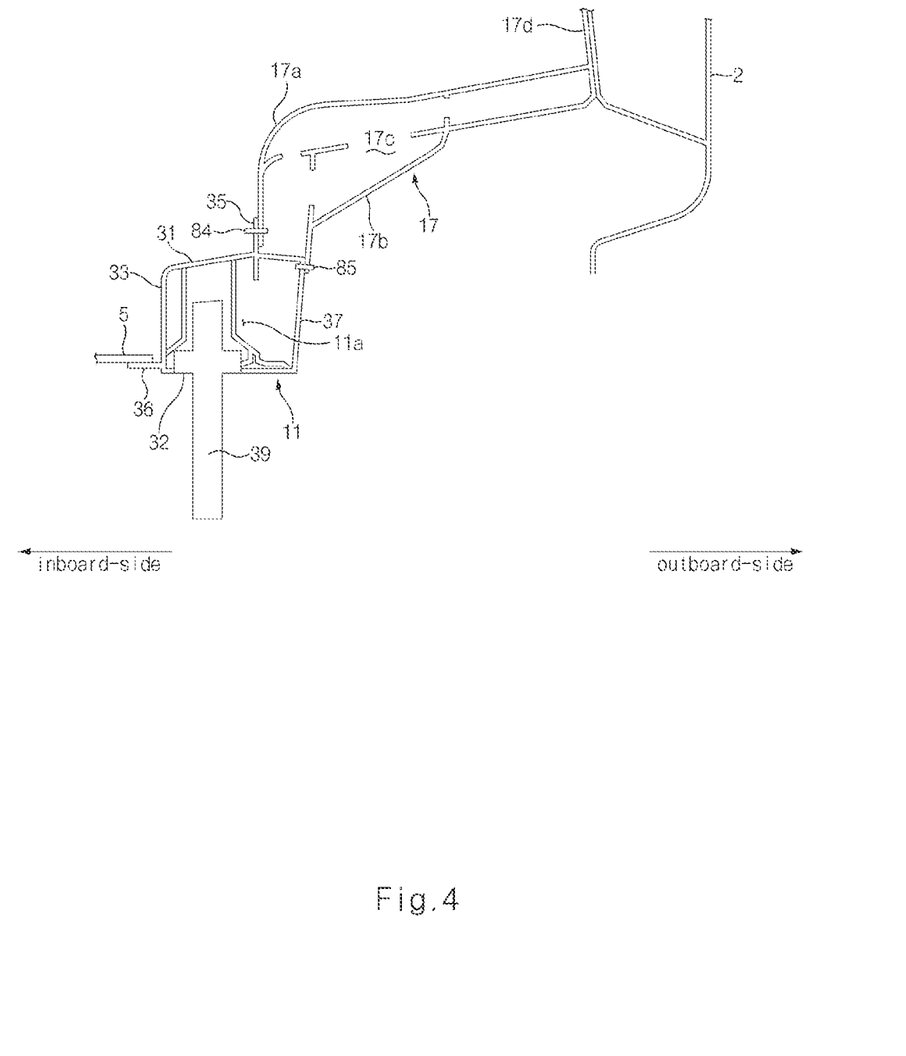
FIG. 4 illustrates a cross-sectional view taken along line C-C of FIG. 1.

Referring to FIGS. 2 to 4, the inboard side wall 33 may face the interior of the vehicle, and the inboard side wall 33 may extend in the longitudinal direction of the vehicle. Each rear side member 11 may include an inboard side flange 36 extending in a longitudinal direction of the inboard side wall 33, and the inboard side flange 36 may protrude from a bottom edge of the inboard side wall 33 toward the interior of the vehicle. The inboard side flange 36 may extend along an edge of the rear floor panel 5, and the inboard side flange 36 may be connected to the edge of the rear floor panel 5 by welding, using fasteners, and/or the like.

Referring to FIGS. 2 and 3, the outboard side wall 34 may face the exterior of the vehicle, and the outboard side wall 34 may extend in the longitudinal direction of the vehicle.

Referring to FIG. 2, the rear side member 11 may have a cavity 11a defined by the top wall 31, the bottom wall 32, the inboard side wall 33, and the outboard side wall 34. The cavity 11a of the rear side member 11 may have a closed transverse cross-section defined by the top wall 31, the bottom wall 32, the inboard side wall 33, and the outboard side wall 34. In particular, as the top wall 31, the bottom wall 32, the inboard side wall 33, and the outboard side wall 34 continuously extend in the longitudinal direction of the vehicle, the closed transverse cross-section of the rear side member 11 may be continuous along a longitudinal direction of the rear side member 11. According to an exemplary embodiment of the present disclosure, as the closed transverse cross-section of the rear side member 11 is continuous along the longitudinal direction of the rear side member 11, stiffness or strength of the rear side member 11 may be improved without additional reinforcement members.

Each rear side member 11 may include the front connection portion 21 located on the front thereof, and the rear connection portion 22 located on the rear thereof. The front connection portion 21 may be connected to a front-side body component such as the side sill 3, and the rear connection portion 22 may be connected to a rear-side body component such as the rear longitudinal member 6. For example, the front connection portion 21 may be connected to a rear end portion of the corresponding side sill 3 by using fasteners, welding, and/or the like, and the rear connection portion 22 may be connected to a front end portion of the corresponding rear longitudinal member 6 by using fasteners, welding, and/or the like.

Figure 8:
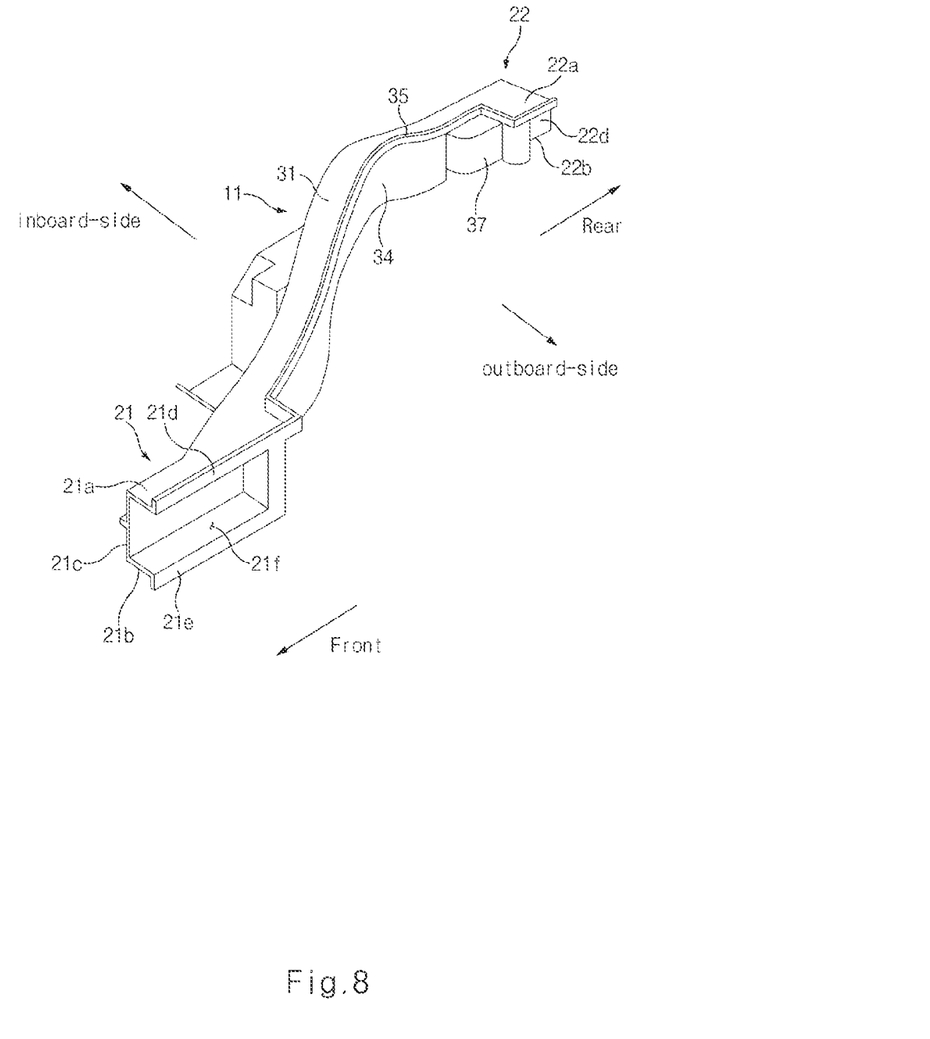
FIG. 8 illustrates a view of a rear side member which is viewed in a direction indicated by arrow E of FIG. 7.

Referring to FIGS. 7 and 8, the front connection portion 21 may include a front top wall 21a facing the top of the vehicle, a front bottom wall 21b opposing the front top wall 21a, a front inboard side wall 21c facing the interior of the vehicle, a top flange 21d extending along an edge of the front top wall 21a, and a bottom flange 21e extending along an edge of the front bottom wall 21b. The front connection portion 21 may have a cavity 21f defined by the front top wall 21a, the front bottom wall 21b, and the front inboard side wall 21c, and the cavity 21f of the front connection portion 21 may be open to the exterior of the vehicle. The cavity 21f of the front connection portion 21 may receive the rear end portion of the corresponding side sill 3, and the front connection portion 21 may be connected to the rear end portion of the corresponding side sill 3 by using fasteners, welding, and/or the like. The front top wall 21a may be continuous from the top wall 31 of the rear side member 11 along the longitudinal direction of the vehicle, and the front bottom wall 21b may be continuous from the bottom wall 32 of the rear side member 11 along the longitudinal direction of the vehicle. The front inboard side wall 21c may be continuous from the inboard side wall 33 of the rear side member 11 along the longitudinal direction of the vehicle.

Referring to FIGS. 7 and 8, the rear connection portion 22 may extend from the rear of the rear side member 11 toward the rear of the vehicle. In particular, the rear connection portion 22 may extend in the longitudinal direction of the vehicle. Referring to FIGS. 1 and 6, the rear connection portion 22 may be connected to the rear longitudinal member 6 by using fasteners, welding, and/or the like. The rear connection portion 22 may include a rear top wall 22a facing the top of the vehicle, a rear bottom wall 22b opposing the rear top wall 22a, a rear inboard side wall 22c facing the interior of the vehicle, and a rear outboard side wall 22d facing the exterior of the vehicle. The rear connection portion 22 may have a cavity (not shown) defined by the rear top wall 22a and the rear inboard side wall 22c. The cavity of the rear connection portion 22 may have a closed transverse cross-section defined by the rear top wall 22a, the rear bottom wall 22b, the rear inboard side wall 22c, and the rear outboard side wall 22d. The cavity of the rear connection portion 22 may directly communicate with the cavity 11a of the rear side member 11. The cavity of the rear connection portion 22 may receive the front end portion of the rear longitudinal member 6. The rear top wall 22a may be continuous from the top wall 31 of the rear side member 11 along the longitudinal direction of the vehicle, and the rear bottom wall 22b may be continuous from the bottom wall 32 of the rear side member 11 along the longitudinal direction of the vehicle. The rear inboard side wall 22c may be continuous from the inboard side wall 33 of the rear side member 11 along the longitudinal direction of the vehicle, and the rear outboard side wall 22d may be continuous from the outboard side wall 34 of the rear side member 11 along the longitudinal direction of the vehicle.

According to an exemplary embodiment of the present disclosure, the rear side member 11 may be made of aluminum or an aluminum alloy, and the rear side member 11, the front connection portion 21, and the rear connection portion 22 may be manufactured by low pressure casting (hollow casting). As the rear side member 11, the front connection portion 21, and the rear connection portion 22 are manufactured by low pressure hollow casting, the rear side member 11, the front connection portion 21, and the rear connection portion 22 may form a unitary one-piece structure. Thus, the number of components required for the rear side member 11 may be reduced, and the weight and manufacturing cost of the vehicle may be reduced.

Figure 10:
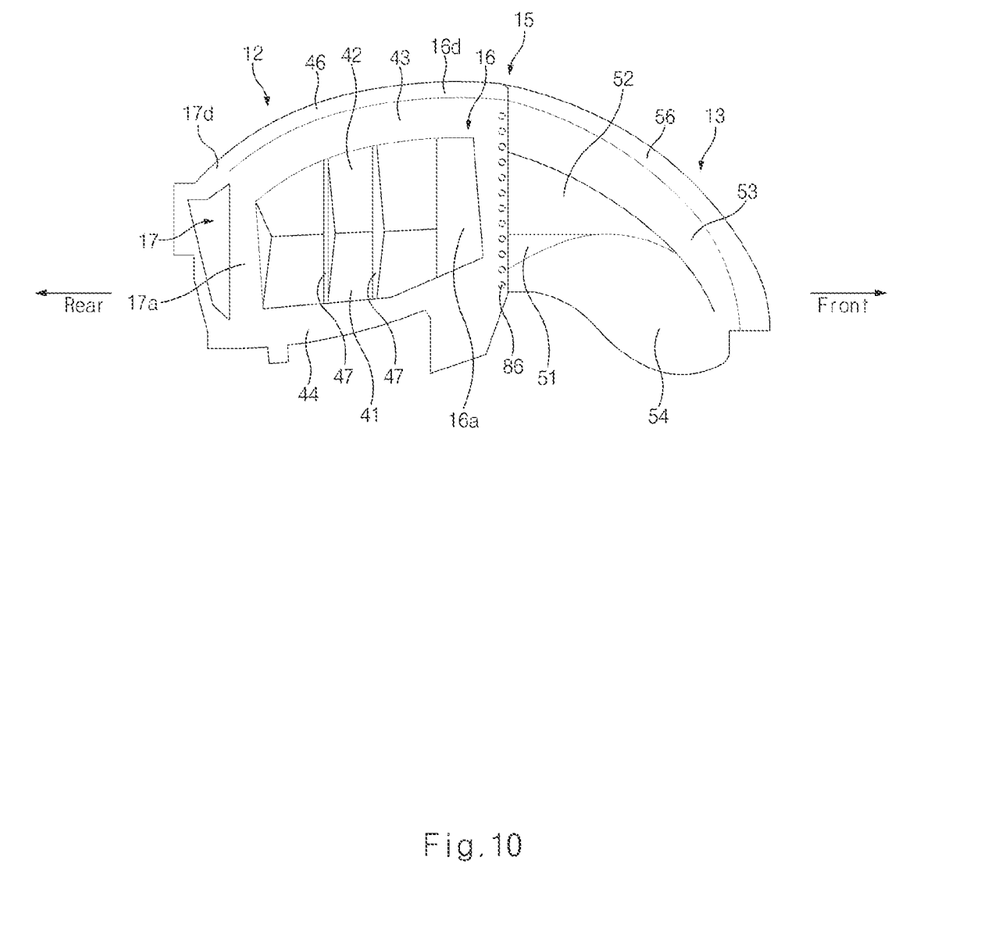
FIG. 10 illustrates a perspective view of a connection structure of a shock absorber mounting member and a rear wheelhouse panel in a rear side structure for a vehicle according to an exemplary embodiment of the present disclosure.

Referring to FIGS. 1 and 6, the shock absorber mounting member 12 may be connected to the outboard side flange 35 of the rear side member 11 together with the rear wheelhouse panel 13. The shock absorber mounting member 12 may be located behind the rear wheelhouse panel 13. The rear wheelhouse panel 13 may be relatively adjacent to the front of the vehicle, and the shock absorber mounting member 12 may be relatively adjacent to the rear of the vehicle. Referring to FIG. 10, a front edge of the shock absorber mounting member 12 may be connected to a rear edge of the rear wheelhouse panel 13 through mechanical fasteners 86 such as self-piercing rivet (SPR) so that the shock absorber mounting member 12 and the rear wheelhouse panel 13 may form a wheel arch 15. Thus, the shock absorber mounting member 12 and the rear wheelhouse panel 13 may have a shape corresponding to half of the wheel arch 15.

Referring to FIG. 2, the shock absorber mounting member 12 may include a shock absorber mounting wall 41, an upper side wall 42 extending outward from the shock absorber mounting wall 41 in a radial direction of the wheel arch 15, an outer peripheral wall 43 extending from the upper side wall 42 toward the exterior of the vehicle, an inner peripheral wall 48 spaced apart inward from the outer peripheral wall 43 in the radial direction of the wheel arch 15, a lower side wall 44 extending inward from the shock absorber mounting wall 41 in the radial direction of the wheel arch 15, and an outboard side flange 46 extending along an outboard side edge of the outer peripheral wall 43. The shock absorber mounting member 12 may have a cavity 49 defined by the upper side wall 42, the outer peripheral wall 43, and the inner peripheral wall 48, and the cavity 49 of the shock absorber mounting member 12 may have a closed transverse cross-section defined by the upper side wall 42, the outer peripheral wall 43, and the inner peripheral wall 48. A top end of a rear shock absorber 9 serving as a damper of a rear suspension system may be mounted to the shock absorber mounting wall 41. The shock absorber mounting wall 41 may be flat to stably support the top end of the rear shock absorber 9. The upper side wall 42 may extend vertically and upwardly from an outboard side edge of the shock absorber mounting wall 41, and the outer peripheral wall 43 may have an arch shape corresponding to half of the wheel arch 15. The lower side wall 44 may extend vertically and downwardly from an inboard side edge of the shock absorber mounting wall 41. Referring to FIG. 2, the lower side wall 44 may be connected to the outboard side flange 35 of the rear side member 11 through mechanical fasteners 81 such as SPR. The outboard side flange 46 may be connected to the corresponding side body 2 by welding, using fasteners, and/or the like.

Figure 9:
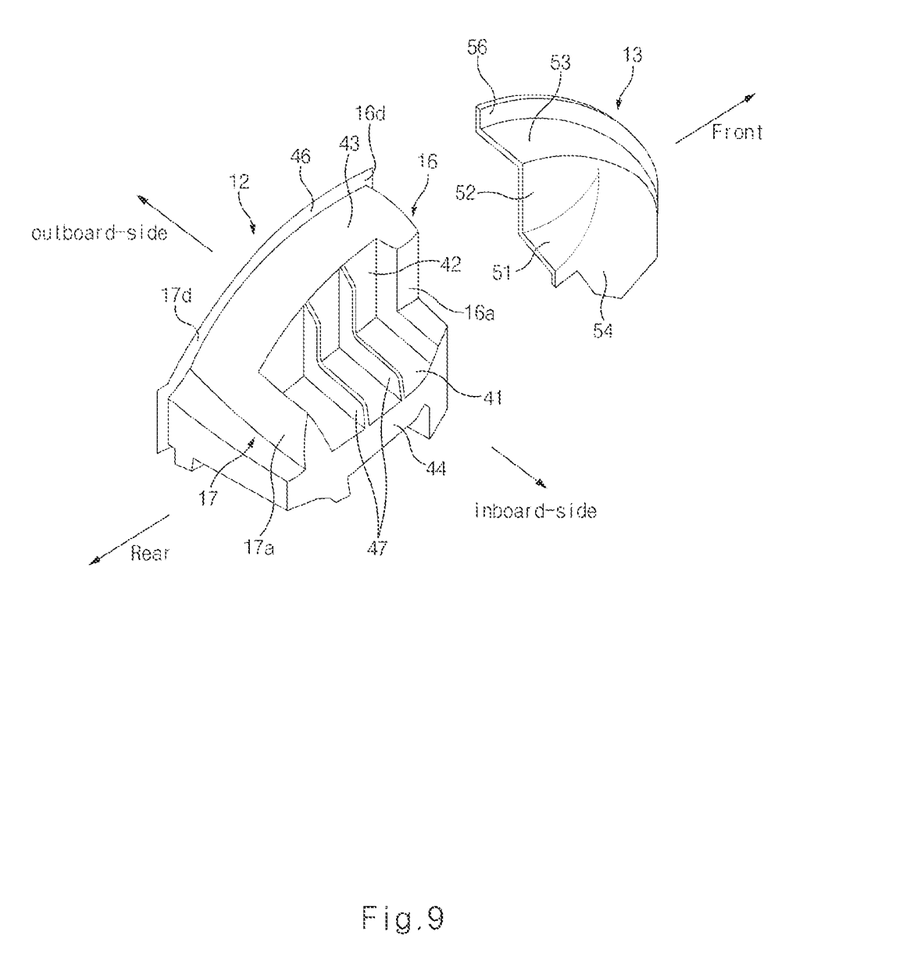
FIG. 9 illustrates an exploded perspective view of a shock absorber mounting member and a rear wheelhouse panel in a rear side structure for a vehicle according to an exemplary embodiment of the present disclosure.

Referring to FIGS. 9 and 10, the shock absorber mounting member 12 may further include a plurality of reinforcing ribs 47, and the plurality of reinforcing ribs 47 may be integrally formed with an inboard side surface of the shock absorber mounting member 12. Each reinforcing rib 47 may have an L-like shape extending along the shock absorber mounting wall 41 and the upper side wall 42 of the shock absorber mounting member 12, and accordingly the plurality of reinforcing ribs 47 may increase stiffness of the shock absorber mounting member 12. As the plurality of reinforcing ribs 47 increase the stiffness of the shock absorber mounting member 12, mounting stiffness of the shock absorber 9 may be improved.

Referring to FIG. 1, the shock absorber mounting member 12 may have a front reinforcing portion 16 and a rear reinforcing portion 17, and the shock absorber mounting wall 41 may be disposed between the front reinforcing portion 16 and the rear reinforcing portion 17. That is, the front reinforcing portion 16 may be located in front of the shock absorber mounting wall 41, and the rear reinforcing portion 17 may be located behind the shock absorber mounting wall 41. The front reinforcing portion 16 may be integrally formed with the front edge of the shock absorber mounting member 12, and the rear reinforcing portion 17 may be integrally formed with a rear edge of the shock absorber mounting member 12.

Referring to FIG. 3, the front reinforcing portion 16 may include an inboard side projection bead 16a protruding from the front edge of the shock absorber mounting member 12 toward the interior of the vehicle and an outboard side projection bead 16b protruding from the front edge of the shock absorber mounting member 12 toward the exterior of the vehicle. The front reinforcing portion 16 may have a cavity 16c defined by the inboard side projection bead 16a and the outboard side projection bead 16b, and the cavity 16c of the front reinforcing portion 16 may have a closed transverse cross-section defined by the inboard side projection bead 16a and the outboard side projection bead 16b. The cavity 16c of the front reinforcing portion 16 may communicate with the cavity 49 of the shock absorber mounting member 12. The front reinforcing portion 16 may have an outboard side flange 16d provided on a top end thereof, and the outboard side flange 16d may be connected to the corresponding side body 2 by using fasteners, welding, and/or the like. The outboard side flange 16d of the front reinforcing portion 16 may be continuous from the outboard side flange 46 of the shock absorber mounting member 12 along a longitudinal direction of the shock absorber mounting member 12.

Referring to FIG. 3, a lower edge of the inboard side projection bead 16*a* of the front reinforcing portion 16 may be connected to the outboard side flange 35 of the rear side member 11 through fasteners 82 such as flow drilling screw (FDS), and a lower edge of the outboard side projection bead 16*b* of the front reinforcing portion 16 may be connected to the outboard side wall 34 of the rear side member 11 through fasteners 83 such as FDS.

Referring to FIG. 4, the rear reinforcing portion 17 may include an inboard side projection bead 17*a* protruding from the rear edge of the shock absorber mounting member 12 toward the interior of the vehicle, and an outboard side projection bead 17*b* protruding from the rear edge of the shock absorber mounting member 12 toward the exterior of the vehicle. The rear reinforcing portion 17 may have a cavity 17*c* defined by the inboard side projection bead 17*a* and the outboard side projection bead 17*b*, and the cavity 17*c* of the rear reinforcing portion 17 may have a closed transverse cross-section defined by the inboard side projection bead 17*a* and the outboard side projection bead 17*b*. The cavity 17*c* of the rear reinforcing portion 17 may communicate with the cavity 49 of the shock absorber mounting member 12. The rear reinforcing portion 17 may have an outboard side flange 17*d* provided on a top end thereof, and the outboard side flange 17*d* may be connected to the corresponding side body 2 by using fasteners, welding, and/or the like. The outboard side flange 17*d* of the rear reinforcing portion 17 may be continuous from the outboard side flange 46 of the shock absorber mounting member 12 along the longitudinal direction of the shock absorber mounting member 12.

Referring to FIGS. 4 and 8, the rear side member 11 may have a rear projection bead 37 protruding from a rear edge of the outboard side wall 34 toward the exterior of the vehicle. Referring to FIG. 4, a lower edge of the inboard side projection bead 17*a* of the rear reinforcing portion 17 may be connected to the outboard side flange 35 of the rear side member 11 through fasteners 84 such as FDS, and a lower edge of the outboard side projection bead 17*b* of the rear reinforcing portion 17 may be connected to the rear projection bead 37 of the rear side member 11 through fasteners 85 such as FDS.

As the shock absorber mounting wall 41 is disposed between the front reinforcing portion 16 and the rear reinforcing portion 17, the top end of the shock absorber 9 may be disposed between the front reinforcing portion 16 and the rear reinforcing portion 17. Thus, the mounting stiffness of the shock absorber 9 may be increased by the front reinforcing portion 16 and the rear reinforcing portion 17.

According to the related art, after a shock absorber mounting member to which the top end of the shock absorber is mounted and reinforcement members for improving the mounting stiffness of the shock absorber are manufactured separately, the reinforcement members may be connected to the shock absorber mounting member by using fasteners, welding, and/or the like. According to exemplary embodiments of the present disclosure, the shock absorber mounting member 12 may be made of aluminum or an aluminum alloy, and the shock absorber mounting member 12, the front reinforcing portion 16, and the rear reinforcing portion 17 may be manufactured by low pressure hollow casting. As the shock absorber mounting member 12, the front reinforcing portion 16, and the rear reinforcing portion 17 are manufactured by low pressure casting (hollow casting), the shock absorber mounting member 12, the front reinforcing portion 16, and the rear reinforcing portion 17 may form a unitary one-piece structure. Thus, compared to the related art, the number of components for the shock absorber mounting member 12 may be reduced, and the weight and manufacturing cost of the vehicle may be reduced.

Referring to FIGS. 8 and 9, the rear wheelhouse panel 13 may include a support wall 51, an upper side wall 52 extending upwardly from the support wall 51, a top wall 53 extending from the upper side wall 52 toward the exterior of the vehicle, and a lower side wall 54 extending downwardly from the support wall 51. The support wall 51 may be continuous from the shock absorber mounting wall 41, and the upper side wall 52 may be continuous from the upper side wall 42 of the shock absorber mounting member 12. The top wall 53 may have a shape corresponding to half of the wheel arch 15. The lower side wall 54 may be continuous from the lower side wall 44 of the shock absorber mounting member 12, and the lower side wall 54 may be connected to the outboard side flange 35 of the rear side member 11 through mechanical fasteners such as SPR. The lower side wall 44 of the shock absorber mounting member 12 and the lower side wall 54 of the rear wheelhouse panel 13 may be connected to the outboard side flange 35 of the rear side member 11. The rear wheelhouse panel 13 may be made of steel or aluminum.

In the related art rear side structure, as the shock absorber mounting member and the rear wheelhouse panel are made of steel, and the shock absorber mounting member is connected to the rear wheelhouse panel by (spot) welding, the number of welds may increase and the welding process may be very complex. On the other hand, according to exemplary embodiments of the present disclosure, the front edge of the shock absorber mounting member 12 and the rear edge of the rear wheelhouse panel 13 may be joined through the mechanical fasteners 86 such as SPR, the number of welds (joint points) of the shock absorber mounting member 12 and the rear wheelhouse panel 13 may be reduced and the joining process (welding process) may be simplified.

As set forth above, according to exemplary embodiments of the present disclosure, by simplifying the connection structure of the rear side member 11, the shock absorber mounting member 12, and the rear wheelhouse panel 13, the rear side member 11 and the shock absorber mounting member 12 may be manufactured by low pressure hollow casting, the number of components and the weight and manufacturing cost may be reduced.

According to exemplary embodiments of the present disclosure, the rear side member may be provided with the front connection portion 21 connected to a front-side body component such as the side sill and the rear connection portion 22 connected to a rear-side body component such as the rear longitudinal member, and the front connection portion 21 and the rear connection portion 22 may be integrally connected to the rear side member 11 by low pressure casting (hollow casting) so that the front connection portion 21, the rear connection portion 22, and the rear side member 11 may form a unitary one-piece structure. By reducing the number of components for the rear side member, the weight and manufacturing cost of the vehicle may be reduced.

According to exemplary embodiments of the present disclosure, the front reinforcing portion 16 and the rear reinforcing portion 17 may be integrally connected to the shock absorber mounting member 12 by low pressure casting (hollow casting) so that the front reinforcing portion 16, the rear reinforcing portion 17, and the shock absorber mounting member 12 may form a unitary one-piece structure. By reducing the number of components for the shock absorber mounting member, the weight and manufacturing cost of the vehicle may be reduced.

According to exemplary embodiments of the present disclosure, as the shock absorber mounting wall 41 is disposed between the front reinforcing portion 16 and the rear reinforcing portion 17, the top end of the shock absorber 9 may be disposed between the front reinforcing portion 16 and the rear reinforcing portion 17, and thus the mounting stiffness of the shock absorber may be improved by the front reinforcing portion and the rear reinforcing portion.

According to exemplary embodiments of the present disclosure, the rear side member 11 and the shock absorber mounting member 12 may be made of a lightweight material such as aluminum, and the rear side member 11 and the shock absorber mounting member 12 may be manufactured by low pressure casting (hollow casting). Thus, the mold cost may be reduced, and the degree of freedom in shaping may be increased compared to casting of steel.

In particular, the rear side member 11 may have a closed transverse cross-section due to low pressure casting (hollow casting), and the shock absorber mounting member 12 may have a closed transverse cross-section due to low pressure casting (hollow casting), and thus the stiffness of the rear side structure may be significantly improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A rear side structure for a vehicle, comprising:
a rear side member extending in a longitudinal direction of the vehicle;
a shock absorber mounting member connected to the rear side member, wherein the shock absorber mounting member has a substantially quarter-circular shape; and
a rear wheelhouse panel connected to the shock absorber mounting member, wherein the rear wheelhouse panel has a substantially quarter-circular shape;
wherein the shock absorber mounting member and the rear wheelhouse panel are joined so that the shock absorber mounting member and the rear wheelhouse panel form a wheel arch;
wherein the shock absorber mounting member is located behind the rear wheelhouse panel and a front edge of the shock absorber mounting member is joined to a rear edge of the rear wheelhouse panel;
wherein the shock absorber mounting member includes a shock absorber mounting wall, and an upper side wall extending outward from the shock absorber mounting wall in a radial direction of the wheel arch; and
wherein the shock absorber mounting wall and the upper side wall are formed as a unitary one-piece structure.

2. The rear side structure according to claim 1, wherein the rear side member includes a cavity, and the cavity has a closed transverse cross-section.

3. The rear side structure according to claim 1, wherein the shock absorber mounting member includes a cavity, and the cavity has a closed transverse cross-section.

4. The rear side structure according to claim 1, wherein:
the rear side member includes an outboard side flange facing an exterior of the vehicle; and
the shock absorber mounting member and the rear wheelhouse panel are connected to the outboard side flange.

5. The rear side structure according to claim 4, wherein:
the rear side member includes a top wall, a bottom wall opposing the top wall, an inboard side wall facing an interior of the vehicle, and an outboard side wall facing the exterior of the vehicle;
the rear side member includes a cavity defined by the top wall, the bottom wall, the inboard side wall, and the outboard side wall; and
the outboard side flange protrudes upwardly from the top wall.

6. The rear side structure according to claim 1, further comprising a plurality of reinforcing ribs provided on an inboard side surface of the shock absorber mounting member.

7. A rear side structure for a vehicle, comprising:
a rear side member extending in a longitudinal direction of the vehicle;
a shock absorber mounting member connected to the rear side member, wherein the shock absorber mounting member has a substantially quarter-circular shape; and
a rear wheelhouse panel connected to the shock absorber mounting member, wherein the rear wheelhouse panel has a substantially quarter-circular shape;
wherein the shock absorber mounting member and the rear wheelhouse panel are joined so that the shock absorber mounting member and the rear wheelhouse panel form a wheel arch,
wherein the shock absorber mounting member is located behind the rear wheelhouse panel and a front edge of the shock absorber mounting member is joined to a rear edge of the rear wheelhouse panel;
wherein the shock absorber mounting member includes:
a shock absorber mounting wall to which a top end of a shock absorber is configured to be mounted;
an upper side wall extending outward from the shock absorber mounting wall in a radial direction of the wheel arch, wherein the shock absorber mounting wall and the upper side wall are formed as a unitary one-piece structure;
a front reinforcing portion located in front of the shock absorber mounting wall, wherein the front reinforcing portion includes a cavity communicating with a cavity of the shock absorber mounting member; and
a rear reinforcing portion located behind the shock absorber mounting wall, wherein the rear reinforcing portion includes a cavity communicating with the cavity of the shock absorber mounting member.

8. The rear side structure according to claim 7, wherein:
the shock absorber mounting member includes an outer peripheral wall extending from the upper side wall toward an exterior of the vehicle, an inner peripheral wall spaced apart inward from the outer peripheral wall in the radial direction of the wheel arch, and a lower side wall extending inward from the shock absorber mounting wall in the radial direction of the wheel arch; and
the cavity of the shock absorber mounting member is defined by the outer peripheral wall, the inner peripheral wall, and the upper side wall.

9. The rear side structure according to claim 8, wherein the lower side wall is connected to an outboard side flange of the rear side member by a plurality of fasteners.

10. The rear side structure according to claim 7, wherein:
the front reinforcing portion includes an inboard side projection bead protruding from a front edge of the shock absorber mounting member toward an interior of the vehicle, and an outboard side projection bead protruding from the front edge of the shock absorber mounting member toward an exterior of the vehicle; and the cavity of the front reinforcing portion is defined by the inboard side projection bead and the outboard side projection bead.

11. The rear side structure according to claim 10, wherein a lower edge of the inboard side projection bead of the front reinforcing portion and a lower edge of the outboard side projection bead of the front reinforcing portion are connected to the rear side member.

12. The rear side structure according to claim 7, wherein:
the rear reinforcing portion includes an inboard side projection bead protruding from a rear edge of the shock absorber mounting member toward an interior of the vehicle, and an outboard side projection bead protruding from the rear edge of the shock absorber mounting member toward an exterior of the vehicle; and the cavity of the rear reinforcing portion is defined by the inboard side projection bead and the outboard side projection bead.

13. The rear side structure according to claim 12, wherein a lower edge of the inboard side projection bead of the rear reinforcing portion and a lower edge of the outboard side projection bead of the rear reinforcing portion are connected to the rear side member.

14. A vehicle body comprising:
a pair of side bodies disposed on both sides of the vehicle body, respectively;
at least one floor panel disposed transverse to bottom ends of the pair of side bodies;
a rear side member extending in a longitudinal direction of the vehicle body and connected to the at least one floor panel;
a shock absorber mounting member connected to the rear side member, wherein the shock absorber mounting member has a substantially quarter-circular shape; and
a rear wheelhouse panel connected to the shock absorber mounting member, wherein the rear wheelhouse panel has a substantially quarter-circular shape;
wherein the shock absorber mounting member and the rear wheelhouse panel are joined so that the shock absorber mounting member and the rear wheelhouse panel form a wheel arch;
wherein the shock absorber mounting member is located behind the rear wheelhouse panel and a front edge of the shock absorber mounting member is joined to a rear edge of the rear wheelhouse panel;
wherein the shock absorber mounting member includes a shock absorber mounting wall and an upper side wall extending outward from the shock absorber mounting wall in a radial direction of the wheel arch; and
wherein the shock absorber mounting wall and the upper side wall are formed as a unitary one-piece structure.

15. The vehicle body according to claim 14, wherein the rear side member includes a cavity, and the cavity has a closed transverse cross-section.

16. The vehicle body according to claim 14, wherein the shock absorber mounting member includes a cavity, and the cavity has a closed transverse cross-section.

17. The vehicle body according to claim 14, wherein:
the rear side member includes an outboard side flange facing an exterior of the vehicle body; and
the shock absorber mounting member and the rear wheelhouse panel are connected to the outboard side flange.

18. The vehicle body according to claim 17, wherein:
the rear side member includes a top wall, a bottom wall opposing the top wall, an inboard side wall facing an interior of the vehicle body, and an outboard side wall facing the exterior of the vehicle body;
the rear side member includes a cavity defined by the top wall, the bottom wall, the inboard side wall, and the outboard side wall; and
the outboard side flange protrudes upwardly from the top wall.

19. The vehicle body according to claim 14, further comprising a plurality of reinforcing ribs provided on an inboard side surface of the shock absorber mounting member.

20. The vehicle body according to claim 14, wherein:
the vehicle body further comprises a shock absorber, a top end of the shock absorber being mounted to the shock absorber mounting wall;
the shock absorber mounting member further includes a front reinforcing portion located in front of the shock absorber mounting wall and a rear reinforcing portion located behind the shock absorber mounting wall;
the front reinforcing portion includes a cavity communicating with a cavity of the shock absorber mounting member; and
the rear reinforcing portion includes a cavity communicating with the cavity of the shock absorber mounting member.

\* \* \* \* \*